Figure 1:
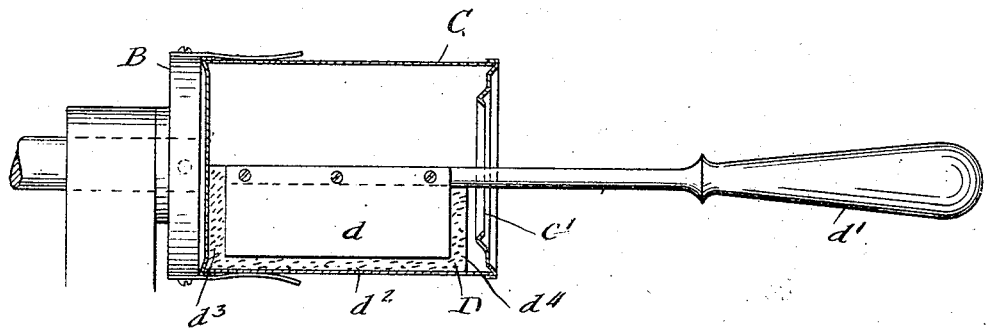

J. G. HODGSON.
PROCESS OF MANUFACTURING LACQUERED OR PROTECTIVE COATED CANS.
APPLICATION FILED JUNE 26, 1907.

998,900.

Patented July 25, 1911.

Witnesses:
Wm. Geiger

Inventor:
John G. Hodgson
By Munday, Evarts, Adcock & Clarke,
Attorneys

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

PROCESS OF MANUFACTURING LACQUERED OR PROTECTIVE-COATED CANS.

998,900. Specification of Letters Patent. Patented July 25, 1911.

Application filed June 26, 1907. Serial No. 380,875.

*To all whom it may concern:*

Be it known that I, JOHN G. HODGSON, a citizen of the United States, residing in Maywood, in the county of Cook and State of Illinois, have invented a new and useful Improvement in Processes of Manufacturing Lacquered or Protective-Coated Cans, of which the following is a specification.

My invention relates to the art or process of manufacturing cans having lacquer or protective coatings on the inside to keep the food or other products within the can from direct contact with the tin plate or with the solder upon the inside of the can at the soldered seams of joints thereof.

The object of my invention is to provide a simple and efficient method or process for rapidly and cheaply manufacturing preserving cans having their interior surfaces protected or coated with a lacquer or preservative coating that will be dry, hard, solid and firmly adherent, innocuous and tasteless, insoluble in vegetable or fruit acids or juices, and which will successfully withstand, without injury, the heat of the cooking or processing step to which the cans are subjected after being filled, and which will also not be blistered or injured by the heat of the soldering operation employed in soldering or securing in place the cap which closes the filling opening in the can, and which, while effectually insulating or protecting the food products in the can from coming in direct contact with the tin or solder surface of the can or seam, will admit of the tin being bent or shaped as may be desired without danger or rupturing or loosening the protective coating, which will impart to the interior surface of the can a 'hard, solid, smooth surface finish or polish.

In practicing my invention I first swab the entire interior surface of the can with a thin film of any suitable lacquer or gum, cut or dissolved in alcohol or other equivalent volatile and inflammable solvent, this being done by inserting a swab or pad saturated with the lacquer in the can and rotating the one in respect to and in contact with the other; I then roll or pass the cans with their open ends lowermost adjacent to a gas or other flame and ignite the volatile and inflammable vapors arising in and issuing from the fresh lacquer coated cans, and thus quickly dry and harden the lacquer coating and impart to it a fine, smooth finish or polish, and cause it to be firmly adherent to the interior surface of the can, while at the same time removing from the lacquer coating all volatile, soluble and odoriferous matters, and thus producing over the entire interior surface of the can a hard, dry, solid, firmly adherent, innocuous, odorless, tasteless, insoluble and perfect sanitary and protective coating, which I find by experiment, repeated tests and practical use extending over a considerable time, is also unaffected by the heat of any ordinary cooking or processing operation to which food products are subjected in preserving cans, or by the heat employed in soldering the cap in place which closes the mouth or filling opening of the can.

The burning of the inflammable vapors arising in and issuing from the cans soon after being coated with the liquid lacquer, I find from experiment and practical use not only has no tendency to injuriously affect the finished or completed protective coating produced on the interior surface of the can, but, on the contrary, has the result of imparting to such protective coating great density and hardness, and to render it very firmly adherent to the metallic surface of the can, the burning operation apparently having a japanning or enameling action upon the coating, while in no way affecting its continuity or the complete covering or coating of the tin or solder surfaces of the can.

Another great advantage of my improved process is that the cans may have their interior surfaces lacquered or protective coated very rapidly and very cheaply, as the treatment of each can may be entirely completed within one or two minutes by my process, as the ignition of the vapors arising in the can tends to facilitate the vaporization of the volatile matters and at the same time burns or destroys them, so that my process can be practically carried on without danger of fire or discomfort or inconvenience to the workmen, as the volatile vapors being consumed in the cans and as they issue therefrom, are not allowed to escape into the room or factory where the work is being done.

My invention, which is in the nature of a discovery, thus, in part, consists in finding out and demonstrating by practical experiment and use that by simply swabbing the interior surfaces of the cans with liquid lacquer containing a volatile and inflammable solvent, and then igniting the vapors arising in the can from the fresh interior lacquer coating thereof, a hard, solid, dry, firmly adherent and perfect and effective continuous protective coating would be produced over the entire interior surface of the can, and that the flame from the ignited vapors would not have the effect of burning any portion of the interior surface of the can bare of the lacquer or the protective coating; but, on the contrary, leave or produce a continuous, complete and perfect coating over the entire interior surface of the can.

Figure 2:
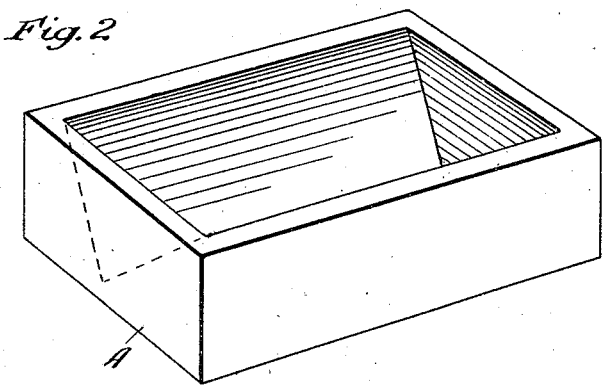
Figure 3:
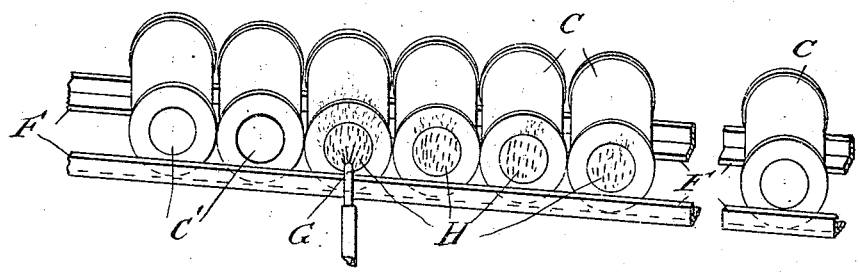

In the accompanying drawing, forming a part of this specification, to enable my invention to be more readily understood and practiced by those skilled in the art, I have illustrated at Figure 1 a rotary chuck and swab suitable for use in practicing my invention; at Fig. 2 a vessel for containing the liquid lacquer, and at Fig. 3 a runway upon which freshly coated cans may be placed and passed or rolled with their open ends lowermost over a gas jet or other flame for igniting the volatile vapors arising in and issuing from the cans.

In the drawing A represents a trough or vessel for holding the liquid lacquer, B the rotating chuck or holder for the can C, the interior of which is to be coated.

D is an absorbent swab or pad consisting preferably of felt, or other like material clamped in a suitable holder $d$, having a handle $d^1$ by which the swab or pad is inserted through the filling opening $C^1$ into the rotating can C held in the chuck B. The absorbent swab is first placed with its lower edge in the lacquer trough A, and then inserted in the rotating can and its bottom edge $d^2$ pressed in contact with the interior periphery of the rotating can, the swab being also reciprocated to bring its end edges $d^3$, $d^4$ in contact with the inner surfaces of the heads of the can, as the can rotates, so that the entire interior surface of the can is coated with a thin film of liquid lacquer. The swab is preferably held inside the can while the can makes several revolutions. If preferred, instead of rotating the can, it may be held stationary and the swab instead rotated. As soon as the can is thus coated on the inside with the liquid lacquer, it is removed from the chuck B and placed on the runway F, which may preferably be somewhat inclined transversely, so that the open end of the can will be lowermost, and also inclined horizontally so that the cans may roll by gravity along the runway past the gas jet or other flame G to ignite the volatile vapors in and arising from the cans. In the drawing H indicates the flame or burning vapors.

By use of the term swabbing in the claims, I wish to be understood as meaning the act of passing an absorbent pad saturated with the lacquer in contact with the interior surface of the can.

I claim:

1. The improvement in the art or process of manufacturing ordinary small sheet metal preserving cans, having continuous hard, solid, firmly adherent, tasteless and odorless protective coatings on the inside, consisting in first swabbing the interior surface of the can with liquid lacquer containing a volatile and inflammable solvent and thereby applying a thin, uniform and continuous film of liquid lacquer over the smooth interior metallic surface of the can, and then igniting and burning the vapors arising in and issuing from the can by passing the cans with their open ends lowermost over a flame, substantially as specified.

2. The improvement in the art or process of manufacturing ordinary small sheet metal preserving cans, having continuous hard, solid, firmly adherent, tasteless and odorless protective coatings on the inside, consisting in first swabbing the interior surface of the can with liquid lacquer containing a volatile and inflammable solvent and thereby applying a thin, uniform and continuous film of liquid lacquer over the smooth interior metallic surface of the can, and then igniting and burning the vapor arising in and issuing from the can by rolling the cans with their open ends lowermost over a flame, substantially as specified.

3. The process of providing ordinary small sheet metal preserving cans with a continuous hard, solid, firmly adherent, tasteless, odorless and insoluble protective coating on the inside, consisting in inserting an absorbent swab or pad adapted to engage the interior peripheral and end surfaces of the can and impregnated with liquid lacquer within the can, then rotating one of said members in respect to and in contact with the other and thereby applying a thin, uniform and continuous film of liquid lacquer over the smooth interior metallic surface of the can, then drying and hardening the lacquer by igniting and burning the vapors arising in and issuing from the can, substantially as specified.

4. The process of providing ordinary small sheet metal preserving cans with a continuous hard, solid, firmly adherent, tasteless, odorless and insoluble protective coating on the inside, consisting in inserting an absorbent swab or pad adapted to engage the interior peripheral and end surfaces of the can and impregnated with liquid lacquer within the can, then rotating the can in respect to and in contact with the swab and thereby applying a thin, uniform and continuous film of liquid lacquer over the smooth interior metallic surface of the can, then drying and hardening the lacquer by igniting and burning the vapors arising in and issuing from the can, substantially as specified.

5. The process of providing ordinary small sheet metal preserving cans with a continuous hard, solid, firmly adherent, tasteless, odorless and insoluble protective coating on the inside, consisting in inserting an absorbent swab or pad impregnated with liquid lacquer within the can, then rotating and reciprocating the can and swab the one in respect to and in contact with the other and thereby applying a thin, uniform and continuous film of liquid lacquer over the smooth interior metallic surface of the can, then drying and hardening the lacquer by igniting and burning the vapors arising in and issuing from the can, substantially as specified.

6. The process of providing ordinary small sheet metal preserving cans with a continuous hard, solid, firmly adherent, tasteless, odorless and insoluble protective coating on the inside, consisting in inserting an absorbent swab or pad impregnated with liquid lacquer within the can, then rotating the can in respect to and in contact with the swab and reciprocating the swab in respect to the can and thereby applying a thin, uniform and continuous film of liquid lacquer over the smooth interior metallic surface of the can, then drying and hardening the lacquer by igniting and burning the vapors arising in and issuing from the can, substantially as specified.

JOHN G. HODGSON.

Witnesses:
EDMUND ADCOCK,
H. M. MUNDAY.